Figure 1:
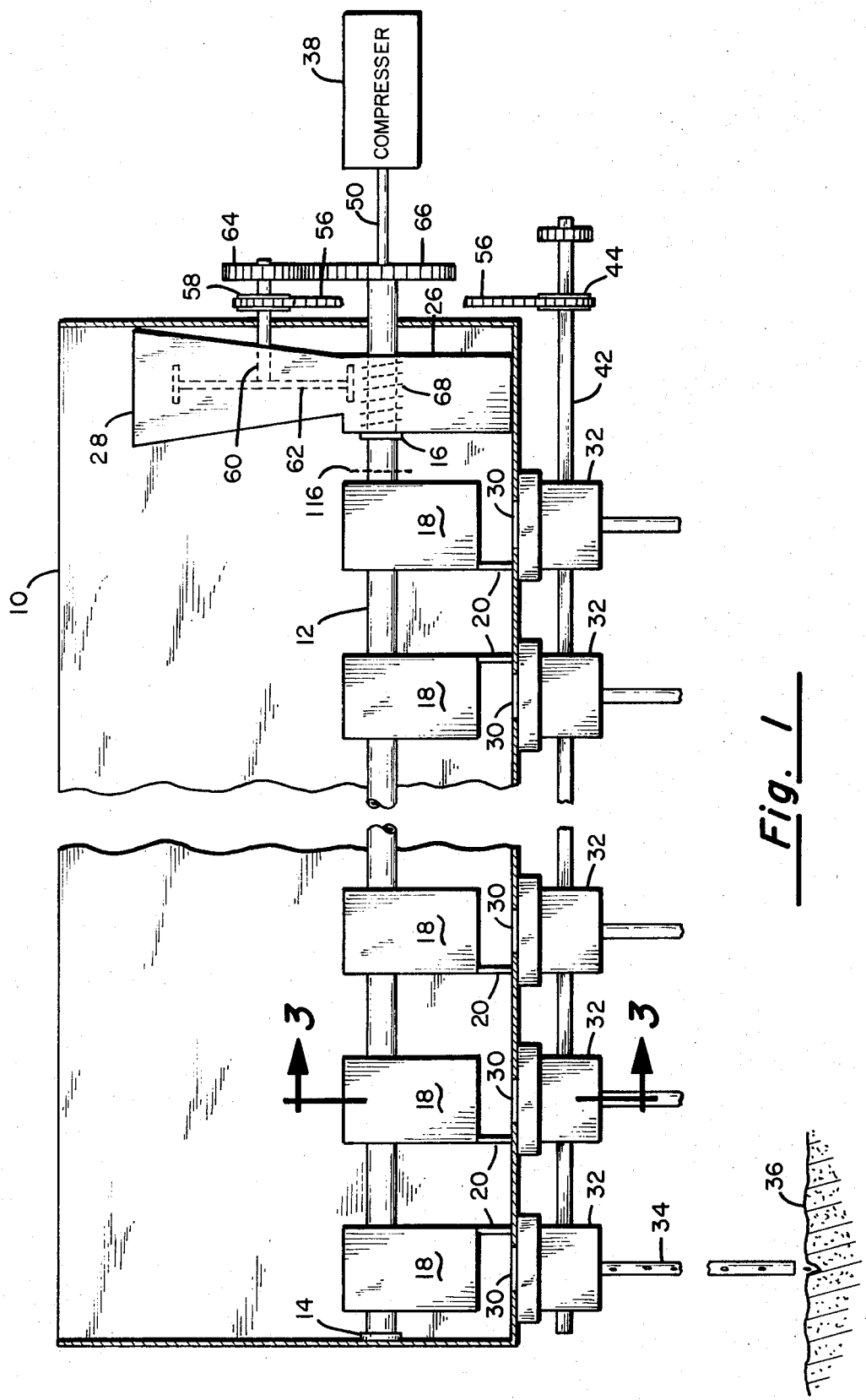

United States Patent [19]
Aanestad et al.

[11] 3,848,772
[45] Nov. 19, 1974

[54] SEED AND SOIL TREATMENT DEVICE

[75] Inventors: Robert D. Aanestad, Burnsville;
Melvin J. Straub, Minnetonka;
Edward J. Norgard, Plymouth, all of Minn.

[73] Assignee: Robert D. Aanestad, Plymouth, Minn.

[22] Filed: Apr. 1, 1974

[21] Appl. No.: 456,524

[52] U.S. Cl. .................. 222/145, 222/176, 222/193
[51] Int. Cl. ............................................. A01c 7/06
[58] Field of Search .......... 222/135, 136, 145, 176, 222/193, 227, 236, 238

[56] References Cited
UNITED STATES PATENTS

| | | | |
|---|---|---|---|
| 308,899 | 12/1884 | Keller | 222/145 |
| 2,965,379 | 12/1960 | Ganley | 222/136 X |
| 3,310,205 | 3/1967 | Meyer | 222/193 |
| 3,679,101 | 7/1972 | Aldridge | 222/136 |
| 3,730,395 | 5/1973 | Gallogly et al. | 222/145 |

Primary Examiner—Stanley H. Tollberg
Assistant Examiner—John P. Shannon
Attorney, Agent, or Firm—Hall & Sjoquist

[57] ABSTRACT

A seed and soil treater having material pneumatically conveyed to a plurality of dispersion cups in a fixed relationship to corresponding seed receivers in a seed box. When used with a grain box or a grain drill, the inventive device conveys material such as seed treatment or soil nutrient material pneumatically through a hollow rotating tube to the dispersion cups with each of said dispersion cups having an orifice therein in juxtaposition with an orifice in said hollow, rotating tube whereby a predetermined quantity of said material is ejected via each of said dispersion cups either onto the seed or into the soil. The orifices in said hollow, rotating tube are equal number to said dispersion cups and are spaced about said tube in a helical pattern whereby a select number of the orifices are in immediate juxtaposition with the orifice in the corresponding dispersion cup at any one time in order to provide positive ejection of material from said tube via said cups with a minimum of pneumatic pressure. Where row crop planters are used, the material is pneumatically conveyed via a manifold successively to the individual seed boxes.

8 Claims, 6 Drawing Figures

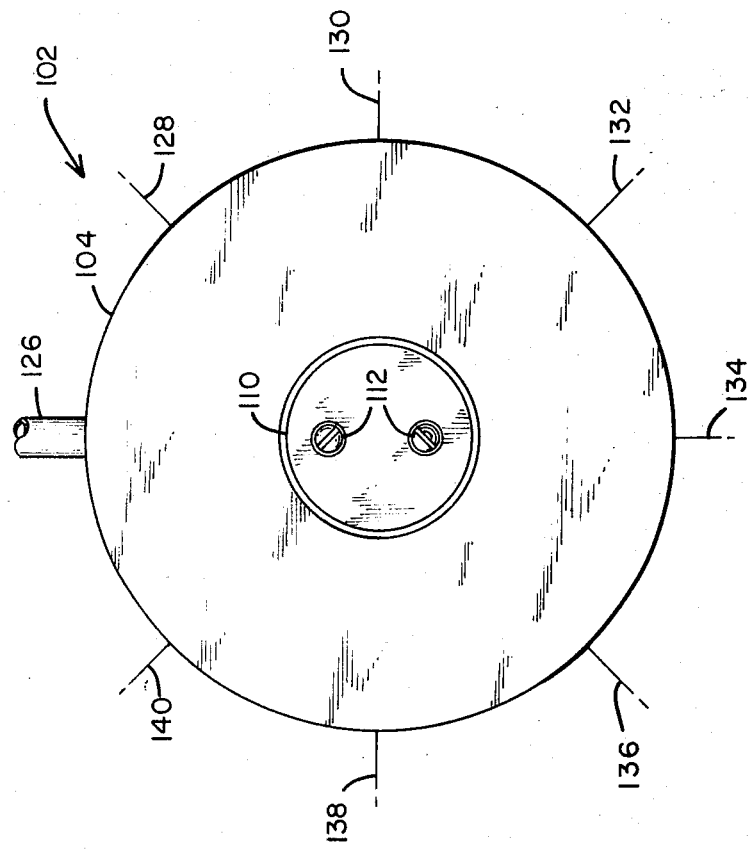
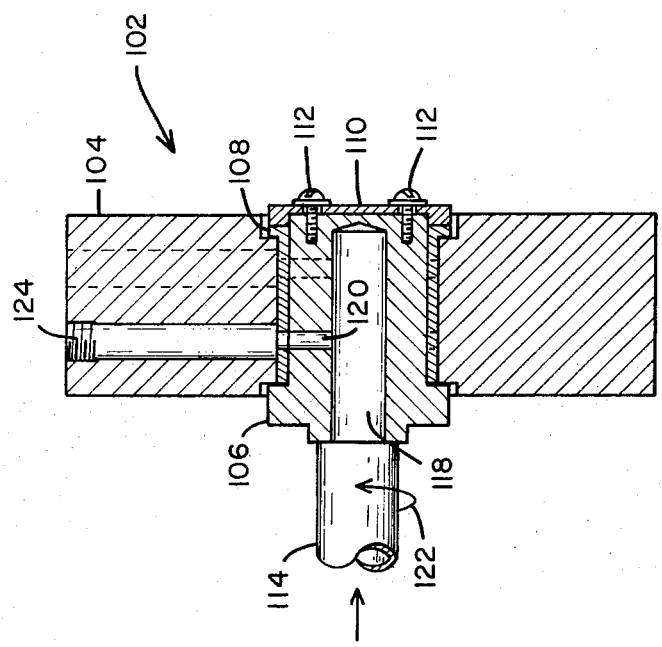
Fig. 6
Fig. 5

SEED AND SOIL TREATMENT DEVICE

BACKGROUND OF THE INVENTION

This invention relates to a seed and soil treater and, more particularly, a seed and soil treater of the type wherein the treatment of the seed takes place within the seed box itself under pneumatic pressure thereby enabling uniform treatment of the seed. The apparatus is so designed that it can be easily attached to all seeder assemblies having either a grain box or a grain drill or with slight modifications can be attached to seeders having a plurality of individual hoppers.

Present state of the art seed and soil treaters all attempt to convey the treatment material directly to the ground and upon or close to the seeds dispersed therein. In such cases it is difficult to obtain uniform treating of the seeds because of the distance the treatment material is required to travel and because of the means used to convey the material.

The treatment material is conveyed to the ground by prior art apparatus either by gravity feed as shown in U.S. Pat. Nos. 3,554,145, 3,512,489, 3,453,977, 3,122,111 and 2,874,878 or pneumatically as shown in U.S. Pat. Nos. 3,548,765 and 3,161,985. In all of these patents, the treatment material is disbursed directly in the ground and a perusal of the patents will quickly reveal that treatment cannot be uniform in relation to each seed placed in the ground.

SUMMARY OF THE INVENTION

The present invention provides a solution to the aforementioned problems by presenting apparatus which not only applies seed treatment material to the seed being planted while the seed is in the seed box or the seeder just prior to the seed being fed out to conduits that deposit it into furrows in the ground but also allows the amount of treatment to be easily and quickly regulated by the operator. Material treatment dispersion cups are placed immediately above seed receiving cups in the bottom of the seed box to apply the treatment material directly to the seed just prior to its being transported to the ground via the conduits. A pneumatic conveying system transports the powdered or liquified treatment material to the dispersion cups in parallel through a hollow rotating tube or via a manifold to row crop planters.

When used with a grain drill, orifices coupling the interior of the hollow tube with the dispersion cups are spaced in a helical pattern about the periphery of the tube to provide pulsed ejections of material into the dispersion cups. The pulsed ejection of treatment material not only causes wide dispersion of the material within and immediately under the dispersion cup but also minimizes the size of the air compressor that is needed for the pneumatic conveying system. Where dry, powdered treatment materials are to be used, a venturi tube creates a vacuum in the interior of said hollow tube immediately adjacent an orifice coupling the supply of material to the tube interior thus pulling the material into the tube interior. In a similar manner, where liquid treatment materials are used, the venturi action atomizes the liquid by creating minute drops of liquid suspended in the air flow and blowing it into the tube interior for transmission to the dispersion cups.

When the invention is used with a row crop planter, a manifold is used having a common inlet and a plurality of outputs each of which is separately connected to a corresponding dispersion cup in each of the seed hoppers via a conduit which would generally be flexible. The distribution of the material to each of the dispersion cups is accomplished in a sequential manner by the rotating manifold and the same results are obtained as previously described in relation to the grain drill.

Thus, it is an object of the present invention to provide a seed and soil treatment apparatus which can be easily attached to any existing seeding apparatus.

It is also an object of the present invention to provide a seed and soil treating apparatus wherein the seed is treated in the seed box just prior to its conveyance from the seed box to the ground.

It is another important object of the present invention to provide a pneumatic seed and soil treater wherein the treatment material is applied to the seed in a pulsed manner to provide wide dispersion of the material over the seed directly under the dispersion cup.

It is yet another object of the present invention to pneumatically convey the treatment material to the dispersion cups in an intermittent and sequential manner in order to provide the most efficient treatment material dispersion while minimizing the size of the air compressor necessary for pneumatic conveyance of the treatment material.

Still another object of the present invention is to utilize venturi action to pull the seed treatment material from the reservoir into the interior of a hollow rotating tube or rotating manifold for transmission to the dispersion cups in parallel.

BRIEF DESCRIPTION OF THE DRAWINGS

These and other more detailed and specific objects will be disclosed in the course of the following specification, reference being had to the accompanying drawings in which like numbers represent like objects in the various Figures and in which:

FIG. 1 is a schematic representation of the novel seed and soil treater mounted on a typical seed drill in the grain box;

FIG. 2 is a drawing of the hollow, rotatable distribution tube showing the orifices therein spaced in a helix pattern about the periphery thereof;

FIG. 3 is a cross-section view of the dispersion cup, grain box, seed receiving cup and flexible conduit taken along section 3—3 of FIG. 1;

FIG. 4 is a detailed view of the venturi located in the bottom of the treatment material hopper shown in FIG. 1;

FIG. 5 is a cross-sectional view of manifold which allows seed or soil treatment material to be sequentially and successively transmitted to individual dispersion cups in the individual seed boxes in a row crop planter; and FIG. 6 is an end view of the manifold in FIG. 5.

DESCRIPTION OF THE PREFERRED EMBODIMENT

In FIG. 1, grain box 10 is a typical grain box supported by a frame (not shown) and wheels (not shown) to carry the frame. A hollow, rotatable tube 12 is attached to the box 10 at one end by bearing 14 and at the other to bearing 16 in hopper 28. Tube 12 passes through a plurality of dispersion cups 18. Each of said dispersion cups 18 has arms 20 extending vertically from said cups 18 and contacting the bottom of box 10 to prevent rotation of said cups. Tube 12 also passes through the lower end 26 of treatment material hopper 28 and rests in bearing 16 therein.

Located immediately under each of the dispersion cups 18 is an opening 30 in the bottom of the grain box through which grain may pass to seed receiving cups 32. The seed receiving cups 32 are well known in the art and may be attached to grain box 10 in any desired fashion such as by rivets or bolts (not shown). The seeds then pass from cups 32 through flexible conduit 34 to the ground 36.

Figure 3:
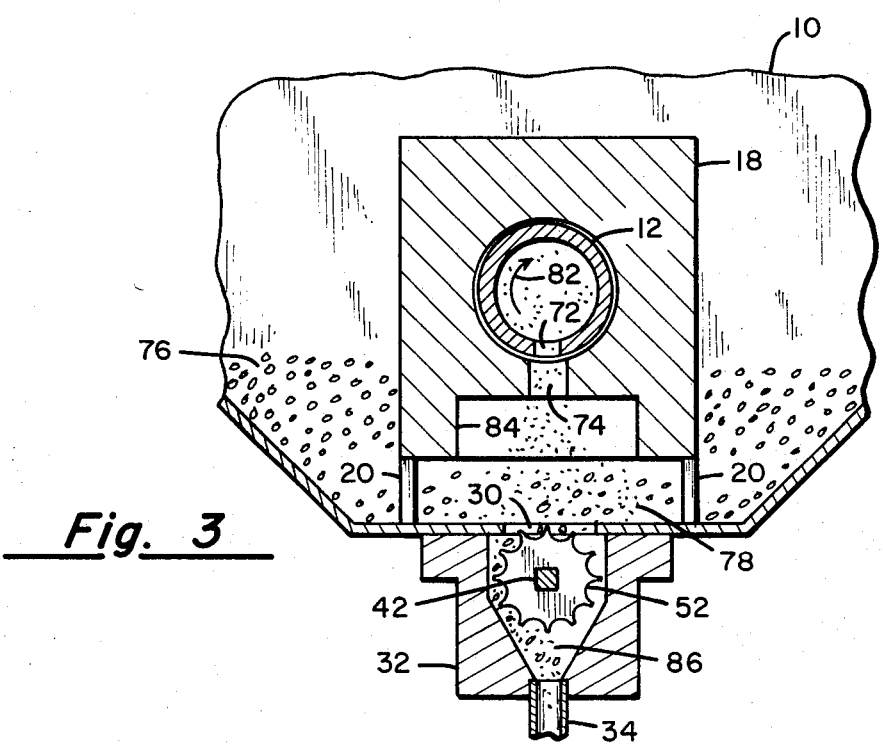

A compressor 38 is mounted in any suitable location on the drill frame and is powered either by an electrical d.c. motor or from the motive power derived from the turning wheels of the grain drill or from the power take-off on the tractor. In any case, the power from the d.c. motor or the turning wheels is used to drive compressor 38. Square shaft 42 is rotated in a well-known manner by the turning wheels of the grain drill. Square shaft 42 also passes through each of the seed receiving cups 32 to turn a notched wheel 52 (shown in FIG. 3) for carrying the received seed to flexible conduit 34 which deposits them in ground 36.

Figure 2:
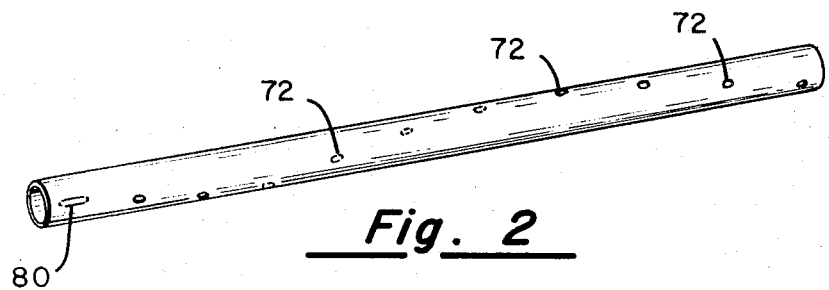

Coupled to square shaft 42 is a sprocket 44 which is operatively coupled to sprocket 58 via chain 56 to operate an agitator 62 in hopper 28. Idler wheels are used where necessary to maintain proper chain tension. When shaft 60 turns, it also rotates agitator 62 which stirs up or agitates the seed treatment material that is stored in hopper 28. This agitation prevents packing of the treatment material in hopper 28 and insures a smooth, continuous flow of treatment material to the bottom of hopper 28 from where it is distributed to dispersion cups 18 as will be more fully understood with reference to FIGS. 2, 3 and 4. For the present, suffice it to say that when agitator shaft 60 rotates, it also rotates gear 64 which drives gear 66 fixedly attached to hollow tube 12 to rotate said tube 12. Gears 64 and 66 form a gear reducing pair which can be quickly changed or replaced to change the rate at which tube 12 rotates and, thus, the rate at which treatment material in hopper 28 is transferred to dispersion cups 18. This, in turn, governs the rate of treatment material application to the seed under each of the dispersion cups 18.

Three variables govern the rate of treatment and determine which set of gear reducers are to be used as gears 64 and 66. These three variables are (1) rate of seeding desired (bushels per acre), (2) rate of treatment desired (ounces of treatment material per bushel) and (3) rate of drilling which is affected by the length of drill (acres per hour). These three factors, when multiplied together, give ounces per hour of treatment material to be applied. When hollow tube 12 is rotated by a mechanical drive from a wheel on the grain drill running on the ground, transfer of material from the hopper 28 to the dispersion cups 18 would be in direct ratio to the ground speed of the tractor pulling the drill and, hence, speed of movement of the drill would not have to be considered. Under the preferred embodiment the operator need merely select a pair of reducing gears predetermined to give the proper ounces of treatment per acre.

As reducing gears 64 and 66 turn, gear 66, which is rigidly attached to tube 12, causes tube 12 to rotate in like manner. Lower end 26 of hopper 28 receives hollow tube 12 and supports it by bearing 16. As will be shown in more detail with reference to FIG. 4, on the inside of lower end 26 of hopper 28, tube 12 has an auger type screw or helical threads 68 about the periphery thereof. As tube 12 rotates, the helical threads form auger which transports the material toward orifices 70 in tube 12. A venturi action on the inside of tube 12, to be explained with reference to FIG. 4, is created by pressure from compressor 38 passing through hose 50 and the resulting suction pulls the treatment material from hopper 28 into the inside of tube 12 through orifices 70 where it becomes entrained in the air flow and is conveyed through the rotating tube 12 to the dispersion cups 18.

Rotating tube 12 has orifices 72 therein that are spaced about the periphery thereof in the form of a helix as shown in FIG. 2. There are an equal number of orifices in said tube 12 as there are dispersion cups. As the tube 12 rotates, orifices 72 sequentially and successively align themselves with orifices 74 in dispersion cups 18 as shown in FIG. 3. The dispersion cup 18 and rotating tube 12 with orifices 72 are so designed that at least one dispersion cup 18 is receiving gaseous treatment material powder flow at any instant. Thus, each dispersion cup 18 receives treatment material in pulses with one pulse occurring each time tube 12 makes one revolution and orifice 72 in tube 12 aligns itself with orifice 74 in dispersion cup 18. Orifice 74, if desired, may be elliptical in shape to minimize tolerance required to align orifice 72 with it. Inasmuch as orifices 72 and 74 are relatively small in actual operation (approximately ¼ in.), and inasmuch as a minimum of dispersion cups 18 are pneumatically receiving significant amounts of treatment material at any instant, the size of compressor 38 required is minimized. Necessarily, there is a frictional rotating joint where tubing 50 connects to rotating tube 12. Such a connection is old and well known in the art and will not be described here.

FIG. 3 is a cross-sectional view of the device shown in FIG. 1 along lines 3—3. Seed box 10 is filled with seeds 76 which surround dispersion cup 18. Orifices 72 in rotating tube 12 may be elongated as shown at 80 in FIG. 2 to allow alignment of itself with orifice 74 in dispersion cup 18.

As tube 12 rotates, for example, in the direction of arrow 82, each revolution places orifice 72 in tube 12 in juxtaposition with orifice 74 in cup 18, it can be seen that orifice 74 couples the interior of tube 12 with depression 84 in cup 18 each time there is correspondence between orifices 72 and 74. This allows the pneumatically transported treatment material to be ejected onto the grain or seed 76 immediately under depression 84. Inasmuch as the distance between cup 18 and opening 30 is from ¼ to ½ inch, very few seeds are treated each time orifices 72 and 74 in alignment but the seeds are thoroughly and uniformly treated. Square shaft 42 turns a wheel 52 in seed receiving cup 32 having serrated edges which gather and hold the treated seeds 78 in opening 30 and conveys them to spout 86 coupled to flexible conduit 34 from where the seeds are directed to ground 36. Arms 20 prevent said dispersion cup from rotating.

FIG. 4 is a detailed view of the venturi device located inside tube 12 within the confines of the lower end 26 of hopper 28. Agitator 62 rests immediately above helical threads 68 about the periphery of rotating tube 12. The agitation of the material in the immediate vicinity of helical threads 68 keep the material in a loose consistency to be movable by threads 68. As tube 12 turns, helical threads 68 cause treatment material 88 to be carried toward a plurality of orifices 70 about the periphery of tube 12. Air from compressor 38 enters tube 12 at 90. Inside tube 12 and coupled directly to opening 90 is venturi 92. Venturi 92 consists of two truncated cones 94 and 96 coupled at the small ends or throat 98. As well known, the venturi action causes pressure in the throat 98 to decrease as velocity increases. Thus, treatment material augered into space 100 by helical threads 68 is sucked through the plurality of orifices 70 in the periphery of tube 12 and becomes entrained in the air flow and carried by tube 12 to all dispersion cups 18 in parallel.

Figure 4:
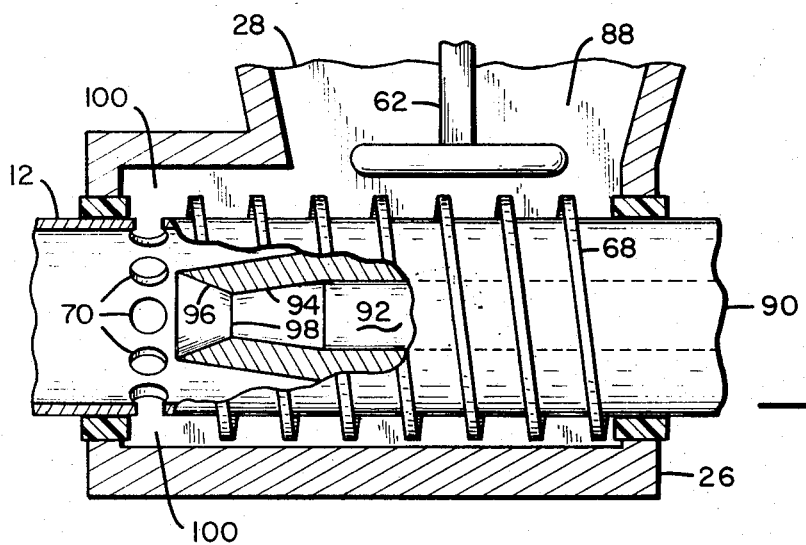

If a liquid-type treater is used, the auger section shown in FIG. 4 is replaced with a straight section of tube 12 and compressor 38 in FIG. 1 is replaced by any of a number of well-known devices that would create minute droplets of treatment material suspended in air flow such as the fogger unit disclosed in U.S. Pat. No. 3,161,985. This suspended material would be conveyed to dispersion cups 18 and distributed to the seed immediately under the dispersion cups 18 in the manner previously described.

FIG. 5 is a cross-sectional view of a manifold 102 which can be used with row crop planters wherein a plurality of individual seed boxes are used with each seed box having its own dispersion cup. Manifold 102 comprises a stator 104 and a rotor 106. Separating rotor 106 and stator 104 is a bearing 108. Cap 110 fits over bearing 108 and is held in place by screw 112 thus allowing rotor 106 to rotate inside stator 104. Tubing 114 represents tube 12 in FIG. 1 attached to manifold 102 at point 116 in FIG. 1. Thus, the same mechanism as described in FIG. 1 rotates rotor 106 in FIG. 5. The inside 118 of rotor 106 is hollow and has an orifice 120 therein. As rotor 106 rotates in the direction of arrow 122, it sequentially and successively communicates with a plurality of orifices 124 in stator 104 thereby transmitting the seed or soil treatment material to the individual dispersion cups in the individual seed boxes (not shown). Each of the dispersion cups is exactly like that shown in FIG. 3 except that a hose or conduit from orifices 124 of the stator 104 is coupled to the dispersion cup instead of tube 12 in FIG. 3. Also, of course, the hose or conduit would not pass all the way through the cup as shown in FIG. 3 but would penetrate sufficiently to communicate with orifice 74 or depression 84. The cup 18 could be mounted in the individual seed boxes in any convenient manner.

FIG. 6 is an end view of manifold 102 showing cap 110 held in place by screws 112 and conduit 126 communicating with orifice 124 in FIG. 5. Obviously, as many orifices 124 could be provided as needed about the periphery of stator 104 as shown at prints 128 through 140.

Although this invention has been described with particular reference to a particular environment, various features, construction details and materials, and functional relationships, various changes will be apparent to one skilled in the art and the invention is not to be limited to any particular environment, materials or functional relationships except as set forth in the appended claims.

We claim:

1. A seed and soil treater mounted on an implement having a frame, a seed box mounted on said frame and having at least one opening in the bottom thereof, a seed receiver mounted under and immediately adjacent said opening and in operative relationship thereto, a conduit attached to said seed receiver for receiving seeds therefrom and depositing them in the ground and ground support wheels attached to said frame, said seed and soil treater comprising:

a. a source of treatment material attached to said frame, b. a dispersion cup mounted in said seed box immediately above said opening at a distance therefrom to allow seeds in said seed box to enter said seed receiver, and c. means coupling said source of treatment material and said dispersion cup for conveying said treatment material to said dispersion cup.

2. A seed and soil treater as in claim 1 wherein said dispersion cup comprises:

a. a body member having a cup-shaped opening in the bottom thereof, a first cylindrical orifice passing horizontally through said body member and located above and spaced apart from said cup-shaped opening and a second orifice coupling said first orifice to said cup-shaped opening, and b. a rotatable, hollow tube passing through said first orifice and having an opening therein in operative relationship with said second orifice.

3. A seed and soil treater as in claim 2 further comprising:

a. means for pneumatically coupling treatment material under pressure to said hollow tube, and b. means for rotating said hollow tube whereby each revolution momentarily places said opening in said hollow tube in juxtaposition with said second orifice whereby a predetermined quantity of treatment material is ejected into said cup-shaped opening of said dispersion cup.

4. A seed and soil treater as in claim 3 wherein said means coupling said source of treatment material and said dispersion cup for pneumatically conveying said treatment material to said dispersion cup comprises:

a. a screw type feeder rigidly attached to the outside of said rotatable hollow tube and positioned in an enclosed portion of the bottom of said source of treatment material, b. at least one orifice in said rotatable hollow tube within said enclosed portion of said source of treatment material and so positioned with respect to said feeder that rotation of said feeder conveys treatment material to said one orifice for admittance to the inside of said rotatable, hollow tube, and c. a venturi tube mounted inside said rotatable tube and positioned so as to create a vacuum immediately adjacent said one orifice and draw said treatment material into the interior of said rotating tube.

5. A method of treating seeds and soils with a conventional grain drill having a frame, a grain box attached to said frame for holding seed, at least one opening in the bottom of said grain box, a seed cup mounted under said opening for receiving seeds, a flexible conduit coupled to said seed cup for conveying received seeds to the ground and ground support wheels attached to said frame, said method comprising the steps of:

a. agitating a source of treatment material mounted on said drill to enable movement thereof, b. transporting said treatment material to a fixed location for admittance to the inside of an elongated hollow, rotatable tube through a first aperture therein, c. creating a vacuum in the vicinity of said first aperture by venturi action to draw said treatment material to the interior of said hollow tube, d. pneumatically transferring said material the entire length of said rotatable tube under pressure, e. operatively coupling the interior of said tube with a confined area of seed immediately above said seed cup by means of a second aperture in said tube, and f. rotating said tube to bring said second aperture in juxtaposition with said confined area at least once each revolution.

6. A method of treating seeds and soils with a conventional seed planter having a frame, a seed box attached to said frame for holding seed, at least one opening in the bottom of said seed box, a seed cup mounted under said opening for receiving seeds, a conduit coupled to said seed cup for conveying received seeds to the ground and ground support wheels attached to said frame, said method comprising the steps of:

a. positioning at least one material dispersion cup in said grain box immediately above and in juxtaposition to said seed receiver at such a distance to allow seeds in said grain box to enter said seed receiver through said opening.

b. mounting a source of treatment material on said frame, and c. intermittently and pneumatically injecting predetermined amounts of said treatment material into said dispersion cup for treating seed and soil.

7. A seed and soil treater as in claim 1 wherein said means coupling said source of treatment material and said dispersion cup comprises:

a. a screw type feeder rigidly attached to the outside of a rotatable, hollow tube and positioned in an enclosed portion of the bottom of said source of treatment material, b. a manifold having a rotor coupled to said hollow tube for receiving treatment material therefrom and an orifice for transmitting said material and a stator having a plurality of orifices therein and receiving said rotor such that said orifice in said rotor successively and sequentially communicates with each of said orifices in said stator for delivering treatment material thereto, and c. a conduit coupling each of said orifices in said stator with a corresponding dispersion cup.

8. A seed and soil treater as in claim 1 wherein said coupling means comprises:

a. a manifold having 1. an input orifice coupled to said source of treatment material under pneumatic pressure,
2. output orifices equal in number to said dispersion cups, and
3. means successively and sequentially coupling said input orifice with each of said output orifices, and b. conduits coupling each of said output orifices with a corresponding dispersion cup.

* * * * *